(12) United States Patent
Alharbi et al.

(10) Patent No.: US 12,006,789 B2
(45) Date of Patent: Jun. 11, 2024

(54) FLOAT VALVE ASSEMBLY FOR DRILLING AND WORKOVER OPERATIONS

(71) Applicant: Saudi Arabian Oil Company, Dhahran (SA)

(72) Inventors: Naif Mohsen Mosleh Alharbi, Dammam (SA); Mohammed A. Jathmi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 183 days.

(21) Appl. No.: 17/686,175

(22) Filed: Mar. 3, 2022

(65) Prior Publication Data

US 2023/0279738 A1 Sep. 7, 2023

(51) Int. Cl.
| | |
|---|---|
| *E21B 34/10* | (2006.01) |
| *C09D 5/00* | (2006.01) |
| *C09D 7/40* | (2018.01) |
| *E21B 21/10* | (2006.01) |

(52) U.S. Cl.
CPC ............... *E21B 34/10* (2013.01); *C09D 5/00* (2013.01); *C09D 7/67* (2018.01); *E21B 21/10* (2013.01)

(58) Field of Classification Search
CPC .......... E21B 34/10; E21B 34/14; E21B 21/10; C09D 7/67; C09D 5/00
See application file for complete search history.

(56) References Cited

U.S. PATENT DOCUMENTS 2,870,784 A 1/1959 Walls

FOREIGN PATENT DOCUMENTS

WO WO 2020118411 6/2020

OTHER PUBLICATIONS

Fakoya et al., "Nanotechnology: innovative applications in the oil and gas industry," Gratis, International Journal of Global Advanced Materials & Nanotechnology, 2018, 1(1):16-30, 16 pages.
Ghasemi-Kahrizsangi et al., "Effect of SDS modification of carbon black nanoparticles on corrosion protection behavior of epoxy nanocomposite coatings," Polymer Bulletin, Jun. 2015, 15 pages.
Mao et al., "Novel hydrophobic associated polymer based nano-silica composite with core shell structure for intelligent drilling fluid under ultra high temperature and ultra high pressure," Science Direct, Progress in Natural Science: Materials International, 2014, 4 pages.
Sengupta et al., "Nano-ceramic coatings—A means of enhancing bit life and reducing drill string trips," IPTC 16474, presented at the IPTC Conference, Beijing, China, Mar. 2013, 9 pages.

*Primary Examiner* — Christopher J Sebesta
(74) *Attorney, Agent, or Firm* — Fish & Richardson P.C.

(57) ABSTRACT

A float valve assembly is configured to be positioned within in a central bore of a tubular string disposed in a wellbore drilled into a subterranean zone. The float valve assembly includes a valve main body and a plunger, and the plunger is biased by a spring towards a closed position and is configured to open in response to a fluid pressure in a downhole direction. The surface of the plunger main body includes a plurality of substantially flat lateral faces forming a pyramid. A hydrophilic nano-coating comprising particles with sizes of between 1 and 100 nanometers is disposed on at least a portion of the surface of the plunger main body.

23 Claims, 4 Drawing Sheets

FLOAT VALVE ASSEMBLY FOR DRILLING AND WORKOVER OPERATIONS

TECHNICAL FIELD

This disclosure relates to wellbore drilling and workover equipment, and in particular a float valve, system, and method.

BACKGROUND

Float valves, or non-return valves, are downhole safety valves that create barriers to prevent unwanted flow of fluids up a drill string or other tubular string for drilling, workover, or other operations in a wellbore. The unwanted flow can be because of pressure changes or due to a well control event.

SUMMARY

This disclosure describes a non-return float valve, system, and method for a drill string or other tubular string in a wellbore.

Certain aspects of the subject matter herein can be implemented as a float valve assembly configured to be positioned within in a central bore of a tubular string disposed in a wellbore drilled into a subterranean zone. The float valve assembly includes a valve main body and a plunger. The main body includes an outer surface substantially cylindrical in shape, a valve flow passage defined in part by an inner surface of the valve main body and configured to be fluidically connected to the central bore, and a circumferential inner sealing surface formed on a portion of the inner body surface. The plunger is positioned within the valve main body and is axially moveable therein, and includes a circular base, a seal ring disposed circumferentially about the circular base, and a plunger main body disposed on the circular base. The surface of the plunger main body includes a plurality of substantially flat lateral faces forming a pyramid. The plunger is biased by a spring towards a closed position in which at least a portion of the seal ring is in contact with the circumferential inner sealing surface, thereby preventing a flow of fluid in an uphole direction through the valve flow passage. The plunger is configured to, in response to a fluid pressure in a downhole direction overcoming a biasing force of the spring, move to an open position in which the seal ring is not in contact with the circumferential inner sealing surface, thereby permitting a flow of fluid in a downhole direction through the valve flow passage. A hydrophilic nano-coating comprising particles with sizes of between 1 and 100 nanometers is disposed on at least a portion of the surface of the plunger main body.

An aspect combinable with any of the other aspects can include the following features. The hydrophilic nano-coating can be further disposed on at least a portion of the circumferential inner sealing surface.

An aspect combinable with any of the other aspects can include the following features. The hydrophilic nano-coating can be further disposed on at least a portion of the inner surface of the valve main body other than the circumferential inner sealing surface.

An aspect combinable with any of the other aspects can include the following features. The hydrophilic nano-coating can be further disposed on at least a portion of the outer surface of the valve main body.

An aspect combinable with any of the other aspects can include the following features. The surface of the main body can include four substantially flat lateral faces forming a orthogonal pyramid.

An aspect combinable with any of the other aspects can include the following features. The surface of the main body can include five substantially flat lateral faces forming a pentagonal pyramid.

An aspect combinable with any of the other aspects can include the following features. The surface of the main body can include six substantially flat lateral faces forming a hexagonal pyramid.

An aspect combinable with any of the other aspects can include the following features. The surface of the main body can include more than six substantially flat lateral faces forming a polygonal pyramid.

An aspect combinable with any of the other aspects can include the following features. The hydrophilic nano-coating can include a non-stick coating.

An aspect combinable with any of the other aspects can include the following features. At least a portion of the circumferential inner sealing surface can be shaped so as to conform to the surface of the main body when the valve is in the closed position.

An aspect combinable with any of the other aspects can include the following features. The float valve assembly can further include one or more outer seals disposed on, and circumferentially about, the outer surface and configured to sealingly engage with an inner surface of the tubular string.

An aspect combinable with any of the other aspects can include the following features. The spring can be a coil spring partially or fully disposed within a helical passageway of a flexible spring sheath.

An aspect combinable with any of the other aspects can include the following features. The helical passageway is a sealed volume, and the sealed volume is at least partially filled with an inert hydrostatic buffer material.

An aspect combinable with any of the other aspects can include the following features. The tubular string can be a drill string and the fluid can be a drilling fluid.

An aspect combinable with any of the other aspects can include the following features. The float valve assembly can further include a bottomhole assembly connected to the drill string that can include a drill bit and that can be configured to further drill the wellbore into the subterranean zone.

Certain aspects of the subject matter herein can be implemented as a well system that includes a tubular string positioned in a wellbore drilled into a subterranean zone and comprising a plurality of tubular segments and a central bore, and a float valve assembly configured to be positioned within the central bore. The float valve assembly includes a valve main body and a plunger. The main body includes an outer surface substantially cylindrical in shape, a valve flow passage defined in part by an inner surface of the valve main body and configured to be fluidically connected to the central bore, and a circumferential inner sealing surface formed on a portion of the inner body surface. The plunger is positioned within the valve main body and is axially moveable therein, and includes a circular base, a seal ring disposed circumferentially about the circular base, and a plunger main body disposed on the circular base. The surface of the plunger main body includes a plurality of substantially flat lateral faces forming a pyramid. The plunger is biased by a spring towards a closed position in which at least a portion of the seal ring is in contact with the circumferential inner sealing surface, thereby preventing a flow of fluid in an uphole direction through the valve flow passage. The plunger is configured to, in response to a fluid pressure in a downhole direction overcoming a biasing force of the spring, move to an open position in which the seal ring is not in contact with the circumferential inner sealing surface, thereby permitting a flow of fluid in a downhole direction through the valve flow passage. A hydrophilic nano-coating comprising particles with sizes of between 1 and 100 nanometers is disposed on at least a portion of the surface of the plunger main body.

An aspect combinable with any of the other aspects can include the following features. The spring can be a coil spring is partially or fully disposed within a helical passageway of a flexible spring sheath.

An aspect combinable with any of the other aspects can include the following features. The helical passageway is a sealed volume, and the sealed volume is at least partially filled with an inert hydrostatic buffer material.

An aspect combinable with any of the other aspects can include the following features. The tubular string can be a drill string and the fluid can be a drilling fluid.

Certain aspects of the subject matter herein can be implemented as a method including positioning a float valve assembly within a central bore of a tubular string, lowering the tubular string into a wellbore drilled into a subterranean zone, sufficiently increasing a fluid pressure of the fluids in the tubular string uphole of the float valve assembly to overcome a biasing force of the spring, thereby causing the plunger to move to an open position in which the seal ring is not in contact with the circumferential inner sealing surface, and flowing a fluid in a downhole direction through the valve flow passage. The float valve assembly includes a valve main body and a plunger. The main body includes an outer surface substantially cylindrical in shape, a valve flow passage defined in part by an inner surface of the valve main body and configured to be fluidically connected to the central bore, and a circumferential inner sealing surface formed on a portion of the inner body surface. The plunger is positioned within the valve main body and is axially moveable therein, and includes a circular base, a seal ring disposed circumferentially about the circular base, and a plunger main body disposed on the circular base. The surface of the plunger main body includes a plurality of substantially flat lateral faces forming a pyramid. The plunger is biased by a spring towards a closed position in which at least a portion of the seal ring is in contact with the circumferential inner sealing surface, thereby preventing a flow of fluid in an uphole direction through the valve flow passage. The plunger is configured to, in response to a fluid pressure in a downhole direction overcoming a biasing force of the spring, move to an open position in which the seal ring is not in contact with the circumferential inner sealing surface, thereby permitting a flow of fluid in a downhole direction through the valve flow passage. A hydrophilic nano-coating comprising particles with sizes of between 1 and 100 nanometers is disposed on at least a portion of the surface of the plunger main body.

An aspect combinable with any of the other aspects can include the following features. The spring can be a coil spring partially or fully disposed within a helical passageway of a flexible spring sheath.

An aspect combinable with any of the other aspects can include the following features. The helical passageway is a sealed volume, and the sealed volume is at least partially filled with an inert hydrostatic buffer material.

An aspect combinable with any of the other aspects can include the following features. The tubular string can be a drill string and the fluid can be a drilling fluid.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

The present disclosure is directed to fluid flow control in downhole tubular strings. Particularly, the present disclosure is directed to a non-return float valve, system, and method for a drill string or other tubular string in a wellbore.

In drilling, completion, workover, or other wellbore operations, it is sometimes desirable to allow fluid to flow in a downhole direction through a tubular string but not in an uphole direction. For example, in drilling operations, drilling mud or other drilling fluid is pumped downhole to operate the bit and to wash cuttings away from the bit face and back up the annulus. Undesirable reverse flow in an uphole direction through the drill string can be encountered, for example, either due to a U-tube effect when the bulk density of the mud in the annulus is higher than that inside the drill pipe, or a well control event. Float valves (sometimes called non-return valves or check valves) are sometimes positioned in drill strings, workover strings, and other downhole tubular strings to allow fluid flow through the string in a downhole direction but prevent fluid flow in an uphole direction. Float valve assemblies can be installed in a tubular string before insertion of the string in the wellbore, or, in some configurations, can be dropped into the tubular string and pumped down and landed into a landing sub configured to receive and lock the valve into place.

Cuttings, debris, particles, pieces or particles of hardened cement or other materials, or other solid, thick, or viscous matter in drilling fluid, mud, formation fluid, or other constituents or materials, can sometimes clog, accumulate on or within, or stick to a float valve assembly or its components, thus interfering with (or potentially interfering with) its function. For example, a valve that is clogged with accumulated material can be less effective in permitting fluid flow in a downhole direction or in preventing fluid flow in an uphole direction, thus reducing drilling or other operational efficiency, increasing costs, and potentially increase environmental or safety risks.

Figure 1:
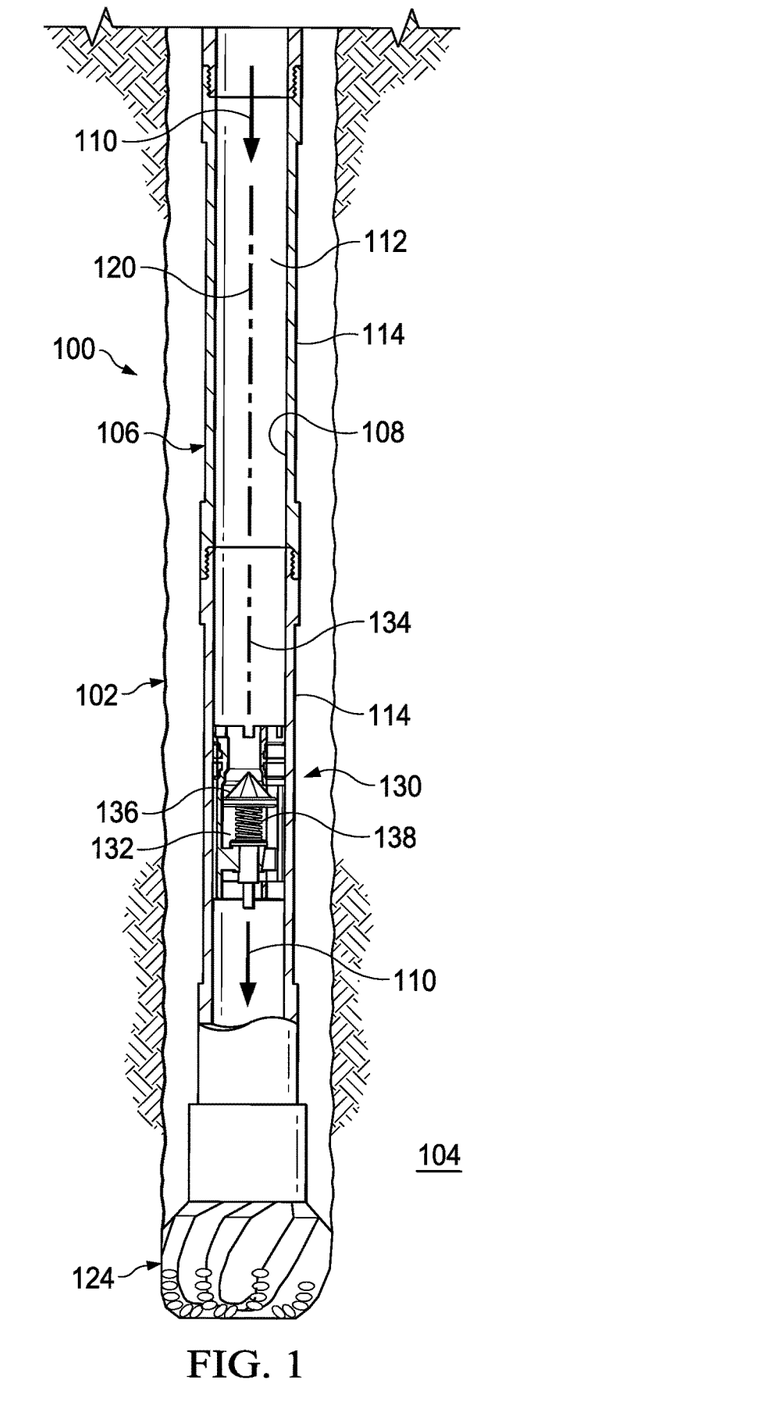
FIG. 1 is a schematic diagram of a well system including a float valve assembly in accordance with an embodiment of the present disclosure.

FIG. 1 is a schematic diagram of a well system including float valve assembly in accordance with an embodiment of the present disclosure. Referring to FIG. 1, system 100 includes wellbore 102 drilled into subterranean zone 104. Tubular string 106 is made up of a plurality of tubular segments 114 and has a substantially cylindrical inner surface 108 defining a central bore 112 through which fluids 110 can flow. Central bore 112 in the illustrated embodiment is substantially cylindrical, is defined in part by inner surface 108 and has a central axis 120. In the illustrated embodiment, tubular string 106 is a drill string, tubular segments 114 are drill string segments, and fluid 110 is drilling fluid pumped in a downhole direction towards a bottomhole assembly 124. Bottomhole assembly 124 can include a drill bit and other components for drilling wellbore 102. In other embodiments, tubular string 106 can be a workover string, production tubing string, or other suitable string of tubular segments for performing drilling, workover, or other downhole operations.

Tubular string 106 further includes a float valve assembly 130 which includes a substantially cylindrical valve flow passage 132 fluidically connected at its uphole and downhole ends with central bore 112 of tubular string 106. In the illustrated embodiment, a central axis 134 of valve flow passage 132 is parallel to and coincident with the central axis 120 of central bore 112. As described in more detail in reference to FIG. 1, float valve assembly 130 in the illustrated embodiment is a piston-type non-return valve assembly including a plunger 136 that is biased towards a closed position by a spring 138. In the closed position, plunger 136 blocks fluid flow through the valve assembly. In response to a fluid pressure in a downhole direction overcoming the biasing force of the spring 138, plunger 136 translates axially in a downhole direction to an open position, thereby permitting a flow of fluid in a downhole direction through the valve flow passage 132 and therefore through central bore 112. As described in further detail in reference to the following figures, plunger 136 in some embodiments of the present disclosure can have a pyramidal shape. In some embodiments of the present disclosure, some or all of plunger 136 and/or some or all of the other components float valve assembly 130 can be coated with a non-stick, hydrophilic nano-coating. In some embodiments of the present disclosure, spring 138 can be at least partially disposed within a flexible coil sheath. Some or all of these elements can reduce the likelihood and/or negative effects of float valve assembly 130 becoming clogged or otherwise undesirably affected by solids or other materials accumulating on or within, or sticking to, a float valve assembly 130 or its components.

Figure 2:
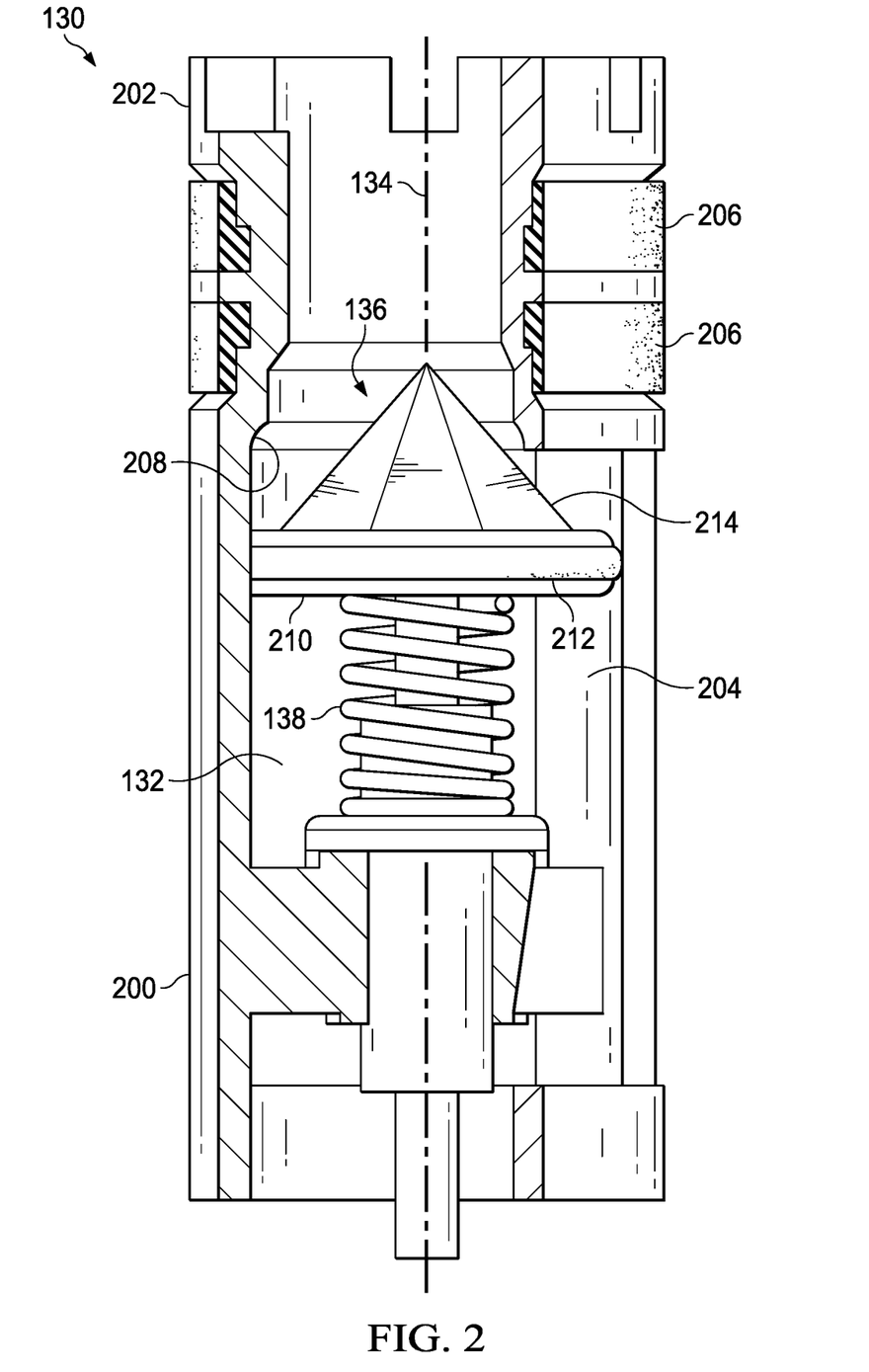
FIG. 2 is a schematic diagram of a float valve assembly in accordance with an embodiment of the present disclosure.

FIG. 2 is a schematic diagram of a float valve assembly 130 of FIG. 1 in accordance with an embodiment of the present disclosure. Referring to FIG. 2, float valve assembly 130 includes valve main body 200 with a substantially cylindrical outer surface 202. Main body 200 in some embodiments can be comprised of stainless steel or another suitable material and can be a single piece (for example, machined from a single block of steel) or can be comprised of two or more body pieces. Valve flow passage 132 is defined in part by an inner surface 204 of the valve main body 200 and (as described above in reference to FIG. 1) is configured to be fluidically connected to the central bore of a tubular string into which float valve assembly is positioned, with central axis 134 parallel and coincident with the central axis of the tubular string central bore.

In the illustrated embodiment, one or more outer seals 206 are disposed on and circumferentially about outer surface 202. Outer seals 206 can be comprised of rubber or another suitable flexible material and can be configured to sealingly engage with an inner surface of the tubular string into which the valve assembly is positioned (for example, inner surface 108 of tubular string 106 of FIG. 1). Float valve assembly 130 further includes a circumferential inner sealing surface 208 formed on a portion of the inner body surface 204.

In the illustrated embodiment, and also as described above in reference to FIG. 1, float valve assembly 130 includes a plunger 136 positioned within the valve main body 200 and axially moveable therein. As shown in FIG. 2, plunger 136 includes a circular base 210, circumferentially around which is disposed a seal ring 212, which can be comprised of rubber or another suitable flexible material. Plunger main body 214 is disposed on the circular base 210. As described in further detail in reference to FIGS. 3A and 3B, plunger main body 214 in the illustrated body comprises an upper surface defined by a plurality of substantially flat lateral faces forming a pyramid.

In operation, plunger 136 is biased by spring 138 towards a closed position in which at least a portion of the seal ring 212 is in contact with (and urged by the biasing force of spring 138 against) the circumferential inner sealing surface 208, thereby preventing a flow of fluid in an uphole direction through the valve flow passage 132. In the illustrated embodiment, spring 138 is a single coil spring. In other embodiments, spring 138 can comprise multiple springs and/or can be a gas piston spring or another suitable type of spring or springs (instead of or in addition to a coil spring). In response to a fluid pressure in a downhole direction overcoming a biasing force of the spring 138, plunger 136 moves to an open position in which the seal ring 212 is not in contact with sealing surface 208, thereby permitting a flow of fluid in a downhole direction through the valve flow passage 132. Thereafter, if the pressure from the fluid flow in the downhole direction becomes insufficient to overcome the biasing force of the spring (for example, if the direction of the fluid flow reverses due to an unexpected well control event), the biasing force of spring 138 causes plunger 136 to move back to the closed position, thereby preventing the flow of fluid through valve flow passage 132.

In some embodiments, when the valve assembly is in the closed position, sealing surface 208 is in contact with the upper surface of main body 214, instead of or in addition to being in contact with circular base 210 and/or seal ring 212. In some embodiments, all or a portion of sealing surface 208 can be shaped so as to confirm with circular base 210 and/or seal ring 212 when plunger 136 is in the closed position. In some embodiments, instead or in addition to being shaped so as to confirm with circular base 210 and/or seal ring 212, all or a portion of sealing surface 208 can be shaped so as to conform to the pyramidal surface of main body 214 when plunger 136 is in the closed position.

Figure 3A:
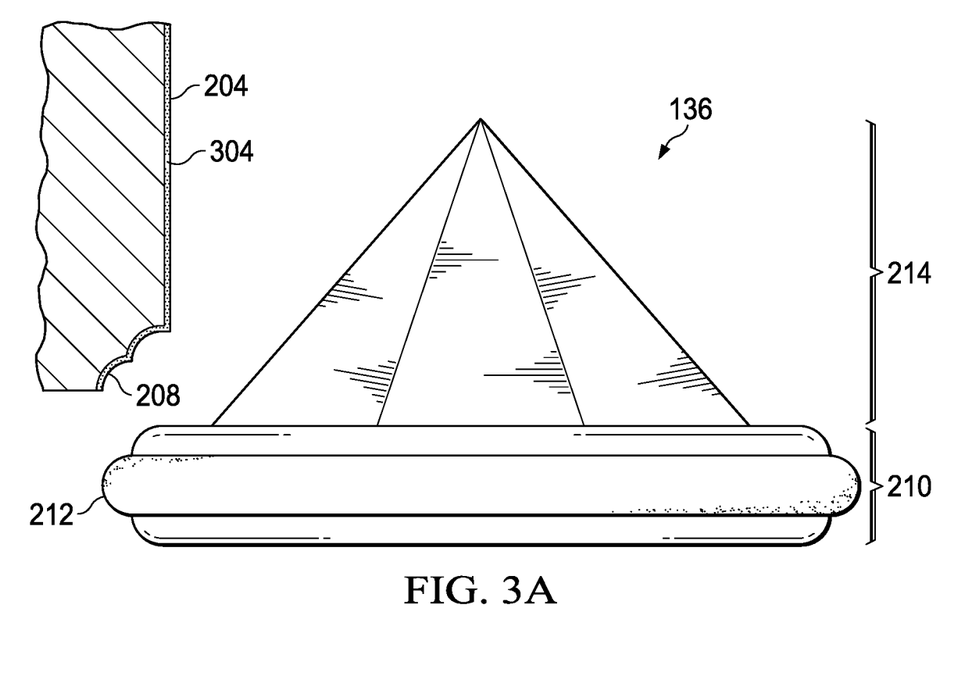
FIGS. 3A and 3B are a schematic diagrams of a plunger of a float valve assembly in accordance with an embodiment of the present disclosure.
Figure 3B:
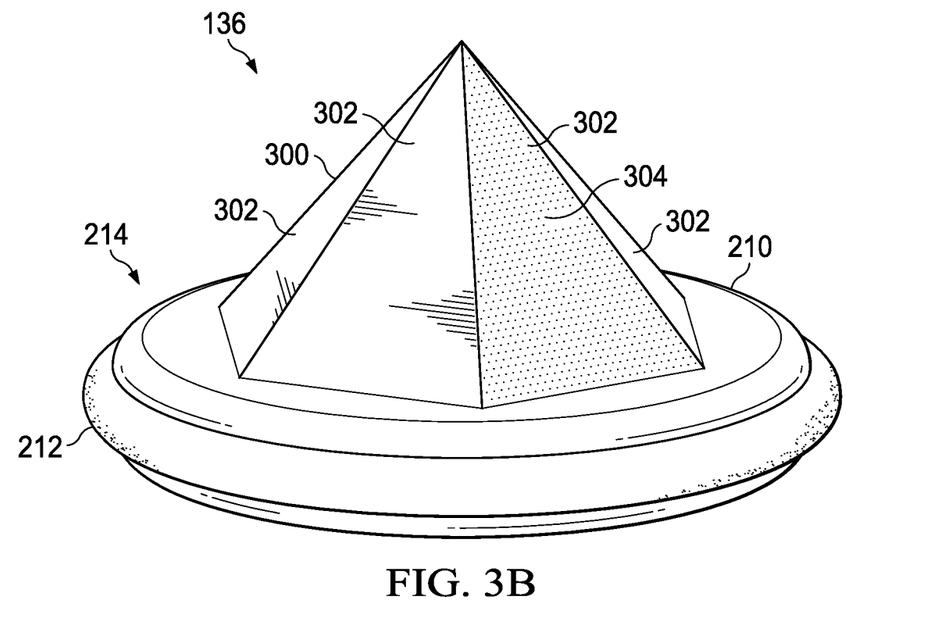

FIGS. 3A and 3B are schematic diagrams of plunger 136 of float valve assembly 130 in accordance with an embodiment of the present disclosure. Specifically, FIG. 3A is an edge-on view plunger 136 and FIG. 3B is a perspective view. Referring to FIGS. 3A and 3B, and as described above in reference to FIG. 2, plunger 136 includes circular base 210 with a seal ring 212 and a plunger main body 214 disposed on the circular base 210.

In accordance with an embodiment of the present disclosure, plunger main body 214 comprises an upper surface 300 defined by a plurality of substantially flat lateral faces 302 forming a pyramid. The flat faces can in some embodiments have an increased slope angle as compared to a conical plunger, thus reducing friction and surface tension of fluids and other materials flowing over upper surface 300 and increasing fluid bonding. The pyramidal shape can more evenly distribute the fluid and allow the flow to take a more direct and straight path across the surface of the plunger. Thus, the rate and volume of fluid flow through the float valve can be increased and clogging, sticking, or accumulation of fluids or entrained particles or materials can be reduced or eliminated.

In the illustrated embodiment, surface 300 is defined by six substantially flat lateral faces 302 forming a hexagonal pyramid. In other embodiments, surface 300 is defined by four substantially flat lateral faces 302 forming an orthogonal pyramid. In other embodiments, surface 300 is defined by five substantially flat lateral faces 302 forming a pentagonal pyramid. In other embodiments, is surface 300 forms a polygonal pyramid defined by more than six substantially flat lateral faces. As the area of surface 300, and therefore the pressure needed to open the valve, is in part a function of the number of faces of the polygonal pyramid. In some embodiments, the plunger can be selected to have an optimum number of faces to correspond with the desired pumping pressure to open the valve (considering also other factors such as the biasing force of the spring).

In accordance with some embodiment of the present disclosure, and as shown in FIG. 3B, a nano-coating 304 is disposed on some or all of lateral faces 302 and/or other portions of surface 300. In some embodiments, nano-coating 304 is a hydrophilic coating comprised of particles with sizes of between 1 and 100 nanometers.

In some embodiments of the present disclosure, and as shown in FIG. 3A, instead of (or in addition to) being disposed on some or all of surface 300 of main body 214, nano-coating 304 can be disposed on some or all circumferential inner sealing surface 208 (as shown in FIG. 3A). In some embodiments of the present disclosure, instead or in addition, and as shown in FIG. 3A, nano-coating 304 can be disposed on some or all of inner surface 204 other than inner sealing surface 208. In some embodiments of the present disclosure, instead or in addition, nano-coating 304 can be disposed on some or all of the outer surface of the valve main body or other components of float valve assembly 130.

Nano-coating 304 can in some embodiments be a nonstick (or substantially non-stick) coating or other suitable nano-coating that can reduce or minimize the accumulation or sticking of dirt, drilling fluids, treatment fluids, hydrocarbons, cuttings, debris, particles, pieces or particles within or on the components of float valve assembly 130 and act as a hard and protective film, thereby preventing or minimizing clogging of the float valve assembly and protecting float valve assembly 130 from corrosion, pitting, scratching, or other undesirable effects.

In some embodiments, nano-coating 304 can be applied by spraying or an immersion process to generate a continuous, high-density inorganic layer. In some embodiments, nano-coating 304 can have a thickness of less than about 100 nanometers. Suitable nano-coatings in some embodiments can be epoxy nanocomposite coatings or polymer composites with silica, aluminum oxide, and/or titanium dioxide. In some embodiments, a suitable nano-coating can be or can include the Nanofinish coating from Aalberts Surface Technologies. Other suitable nano-coatings can comprise stainless steel powders available from Nanoshel and/or nano-coatings available from Nano-Ceramic International and Nasiol.

In some embodiments of the present disclosure, nano-coating 304 can be or can comprise other suitable materials or coatings in addition to (or instead of) the above-described coatings. In some embodiments, nano-coating 304 can comprise a single material; in other embodiments, nano-coating 304 can comprise more than one material; for example, a mixture of different materials. In some embodiments, nano-coating 304 is the only coating on the surfaces of the components of the float valve assembly; in other embodiments, a portion or all of some or all of the components, segments, or surfaces can be covered by other coatings in addition to or instead of nano-coating 304. In some embodiments, some portions, components, surfaces, or segments of the float valve assembly have different types or thicknesses of nano-coatings than other portions, components, surfaces, or segments of the float valve assembly. In this disclosure, references to first component (or a surface of a first component) being "in contact with" a second component (or a surface of a second component) of the includes (a) contact with no coating between the first component or surface and the second component or surface, or (b) contact except for a coating or coatings on one or both of (and therefore between) the first and second component or surface.

In some embodiments of the present disclosure, a float valve assembly can include components, elements, and/or features in addition to those described above. In some embodiments of the present disclosure, a float valve assembly can have some but not all of the components, elements, and features as described above. For example, in some embodiments, a float valve assembly can include the plunger with a plurality of substantially flat lateral faces forming a pyramid on the plunger main body as described in reference to FIGS. 3A and 3B, but not include a nano-coating as described in reference to FIGS. 3A and 3B on the plunger or on any other parts of the float valve assembly. In other embodiments, a float valve assembly can include the nano-coating on some or all of the surfaces and/or components of the float valve assembly as described in reference to FIGS. 3A and 3B, but not include a plunger with a plurality of substantially flat lateral faces forming a pyramid on the plunger main body as described in reference to FIGS. 3A and 3B.

Figure 4A:
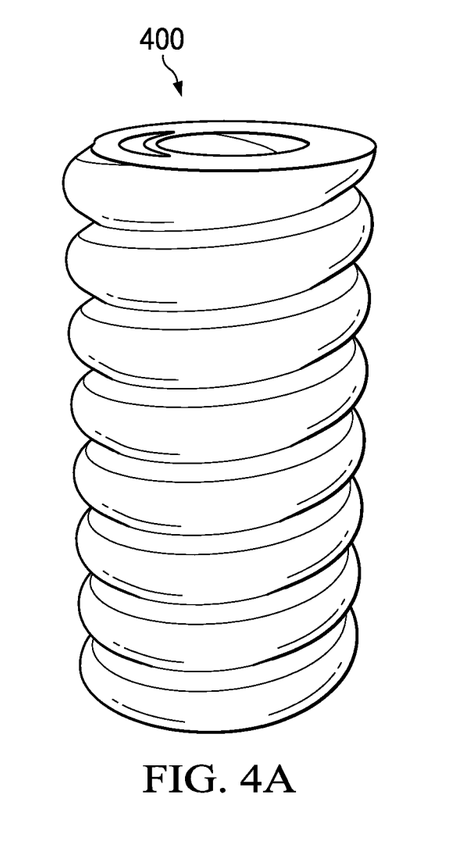
FIGS. 4A and 4B are schematic diagrams of a jacketed spring of a float valve assembly in accordance with an embodiment of the present disclosure.
Figure 4B:
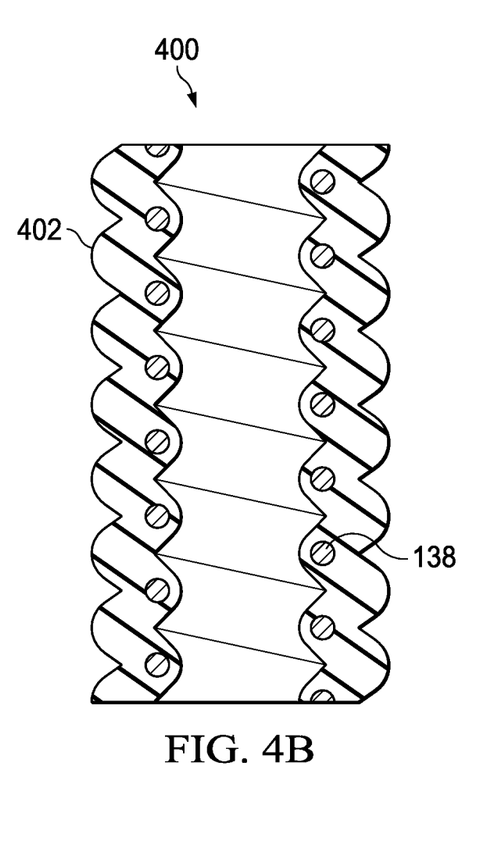

In some embodiments of the present disclosure, the float valve assembly includes a flexible spring sheath within which the spring or springs of the float valve is disposed, to prevent or minimize the accumulation of cuttings, debris, particles, pieces or particles within or proximate to the spring and to reduce or prevent oxidation or other effects from spring exposure. FIGS. 4A and 4B are schematic diagrams of such a flexible spring sheath in accordance with an embodiment of the present disclosure. Such a sheath can permit the spring to function but prevent minimize the negative effects of such accumulation and extend spring life and proper function.

Referring to FIG. 4A, flexible spring sheath 400 can comprise rubber, fabric, or another suitable material and can partially or fully encase one or more of the springs of the float valve assembly. In the illustrated embodiment, sheath 400 is configured for helical coil spring (which, in the illustrated example, is spring 138 of float valve assembly 130 of FIGS. 1 and 2). An interior of sheath 400, as shown in FIG. 4B, defines a helical passageway 402. The helix defined by the passageway in the illustrated embodiment has the same (or substantially the same) diameter, pitch, and lead of the helix of the coil spring, and the inner diameter of the passageway 402 is equal to or greater than the diameter of the coil wire of spring 138. So configured, helical coil spring 138 can be disposed partially or fully within helical passageway 402 as shown in FIG. 4B. In some embodiments, sheath 400 can comprise a tear-resistant and flexible rubber, plastic, polyethylene, silicone, or other suitable material. In some embodiments, helical passageway 402 is a sealed volume at least partially filled with an inert hydrostatic buffer material such as nitrogen gas to reduce or prevent oxidation and collapse of the sheath due to differences in hydrostatic pressure.

Figure 5:
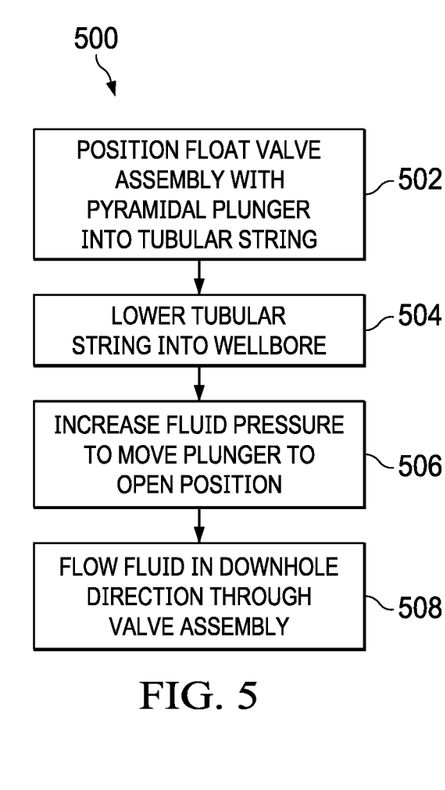
FIG. 5 is a process flow diagram of a method of installing and operating a valve assembly in accordance with an embodiment of the present disclosure.

FIG. 5 is a process flow diagram of a method 500 of installing and operating a well system in accordance with an embodiment of the present disclosure. The method begins at step 502 in which a float valve assembly is positioned within a central bore of a tubular string. The float valve assembly can in some embodiments be a float valve assembly the same or substantially the same as float valve assembly 130 of FIGS. 2, 3A-3B, and 4A-4B. Specifically, the float valve assembly can include a valve main body which includes an outer surface substantially cylindrical in shape, a valve flow passage defined in part by an inner surface of the valve main body and configured to be fluidically connected to the central bore, and a circumferential inner sealing surface formed on a portion of the inner body surface. The float valve assembly can further include a plunger positioned within the valve main body and axially moveable therein. The plunger can be a pyramidal plunger as described in reference to FIGS. 3A and 3B, including a circular base, a seal ring disposed circumferentially about the circular base, and a plunger main body disposed on the circular base. The surface of the plunger main body can include a plurality of substantially flat lateral faces forming a pyramid. The plunger can be biased, by a spring, towards a closed position in which at least a portion of the seal ring is in contact with the circumferential inner sealing surface, thereby preventing a flow of fluid in an uphole direction through the valve flow passage. A hydrophilic nano-coating comprising particles with sizes of between 1 and 100 nanometers can be disposed on at least a portion of the surface of the plunger main body.

Proceeding to step 504, the tubular string is lowered into a wellbore drilled into a subterranean zone. In some embodiments (for example, in an embodiment wherein the float valve assembly is a drop-in type float valve assembly), the step of 504 can occur before the step of 502. Proceeding to step 506, a fluid pressure of the fluids in the tubular string uphole of the float valve assembly is sufficiently increased to overcome a biasing force of the spring, causing the plunger to move to an open position in which the seal ring is not in contact with the circumferential inner sealing surface. Proceeding to step 508, fluid is flowed in a downhole direction past the open plunger and through the valve flow passage. Thereafter, if the pressure from the fluid flow in the downhole direction becomes insufficient to overcome the biasing force of the spring (for example, if the direction of the fluid flow reverses due to an unexpected well control event), the biasing force of spring causes the plunger to move back to the closed position, thereby preventing the flow of fluid through the valve flow passage 132.

The term "uphole" as used herein means in the direction along the production tubing or the wellbore from its distal end towards the surface, and "downhole" as used herein means the direction along the production tubing or the wellbore from the surface towards its distal end. A downhole location means a location along a work string, drill string, production tubing, casing, or or wellbore downhole of the surface.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" mean a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

What is claimed is:

1. A float valve assembly configured to be positioned within in a central bore of a tubular string disposed in a wellbore drilled into a subterranean zone, the float valve assembly comprising:
  a valve main body comprising:
    an outer surface substantially cylindrical in shape;
    a valve flow passage defined in part by an inner surface of the valve main body and configured to be fluidically connected to the central bore; and
    a circumferential inner sealing surface formed on a portion of the inner body surface; and
  a plunger positioned within the valve main body and axially moveable therein, the plunger comprising:
    a circular base;
    a seal ring disposed circumferentially about the circular base; and
    a plunger main body disposed on the circular base, a surface of the plunger main body comprising a plurality of substantially flat lateral faces forming a pyramid;
  and wherein:
    the plunger is biased, by a spring, towards a closed position in which at least a portion of the seal ring is in contact with the circumferential inner sealing surface, thereby preventing a flow of fluid in an uphole direction through the valve flow passage;

the plunger is configured to, in response to a fluid pressure in a downhole direction overcoming a biasing force of the spring, move to an open position in which the seal ring is not in contact with the circumferential inner sealing surface, thereby permitting a flow of fluid in a downhole direction through the valve flow passage; and a hydrophilic nano-coating comprising particles with sizes of between 1 and 100 nanometers is disposed on at least a portion of the surface of the plunger main body.

2. The float valve assembly of claim 1, wherein the hydrophilic nano-coating is further disposed on at least a portion of the circumferential inner sealing surface.

3. The float valve assembly of claim 1, wherein the hydrophilic nano-coating is further disposed on at least a portion of the inner surface of the valve main body other than the circumferential inner sealing surface.

4. The float valve assembly of claim 1, wherein the hydrophilic nano-coating is further disposed on at least a portion of the outer surface of the valve main body.

5. The float valve assembly of claim 1, wherein the surface of the main body comprises four substantially flat lateral faces forming an orthogonal pyramid.

6. The float valve assembly of claim 1, wherein the surface of the main body comprises five substantially flat lateral faces forming a pentagonal pyramid.

7. The float valve assembly of claim 1, wherein the surface of the main body comprises six substantially flat lateral faces forming a hexagonal pyramid.

8. The float valve assembly of claim 1, wherein the surface of the main body comprises more than six substantially flat lateral faces forming a polygonal pyramid.

9. The float valve assembly of claim 1, wherein the hydrophilic nano-coating comprises a non-stick coating.

10. The float valve assembly of claim 1, wherein at least a portion of the circumferential inner sealing surface is shaped so as to conform to the surface of the main body when the valve is in the closed position.

11. The float valve assembly of claim 1, further comprising one or more outer seals disposed on, and circumferentially about, the outer surface and configured to sealingly engage with an inner surface of the tubular string.

12. The float valve assembly of claim 1 wherein the spring is a coil spring and the coil spring is partially or fully disposed within a helical passageway of a flexible spring sheath.

13. The float valve assembly of claim 12, wherein the helical passageway is a sealed volume, and wherein the sealed volume is at least partially filled with an inert hydrostatic buffer material.

14. The float valve assembly of claim 1, wherein the tubular string is a drill string, and wherein the fluid is a drilling fluid.

15. The float valve assembly of claim 14, further comprising a bottomhole assembly connected to the drill string, the bottomhole assembly comprising a drill bit and configured to further drill the wellbore into the subterranean zone.

16. A well system, comprising:
a tubular string positioned in a wellbore drilled into a subterranean zone and comprising a plurality of tubular segments and a central bore; and
a float valve assembly configured to be positioned within the central bore, the float valve assembly comprising:
a valve main body comprising:
an outer surface substantially cylindrical in shape;
a valve flow passage defined in part by an inner surface of the valve main body and configured to be fluidically connected to the central bore; and
a circumferential inner sealing surface formed on a portion of the inner body surface; and
a plunger positioned within the valve main body and axially moveable therein, the plunger comprising:
a circular base;
a seal ring disposed circumferentially about the circular base; and
a plunger main body disposed on the circular base, a surface of the plunger main body comprising a plurality of substantially flat lateral faces forming a pyramid;
and wherein:
the plunger is biased, by a spring, towards a closed position in which at least a portion of the seal ring is in contact with the circumferential inner sealing surface, thereby preventing a flow of fluid in an uphole direction through the valve flow passage;
the plunger is configured to, in response to a fluid pressure in a downhole direction overcoming a biasing force of the spring, move to an open position in which the seal ring is not in contact with the circumferential inner sealing surface, thereby permitting a flow of fluid in a downhole direction through the valve flow passage; and
a hydrophilic nano-coating comprising particles with sizes of between 1 and 100 nanometers is disposed on at least a portion of the surface of the plunger main body.

17. The well system of claim 16, wherein the spring is a coil spring and the coil spring is partially or fully disposed within a helical passageway of a flexible spring sheath.

18. The well system of claim 17, wherein the helical passageway is a sealed volume, and wherein the sealed volume is at least partially filled with an inert hydrostatic buffer material.

19. The well system of claim 16, wherein the tubular string is a drill string, and wherein the fluid is a drilling fluid.

20. A method comprising:
(a) positioning a float valve assembly within a central bore of a tubular string, the float valve assembly comprising:
a valve main body comprising:
an outer surface substantially cylindrical in shape;
a valve flow passage defined in part by an inner surface of the valve main body and configured to be fluidically connected to the central bore; and
a circumferential inner sealing surface formed on a portion of the inner body surface; and
a plunger positioned within the valve main body and axially moveable therein, the plunger comprising:
a circular base;
a seal ring disposed circumferentially about the circular base; and
a plunger main body disposed on the circular base, a surface of the plunger main body comprising a plurality of substantially flat lateral faces forming a pyramid;
and wherein:
the plunger is biased, by a spring, towards a closed position in which at least a portion of the seal ring is in contact with the circumferential inner sealing surface, thereby preventing a flow of fluid in an uphole direction through the valve flow passage; and a hydrophilic nano-coating comprising particles with sizes of between 1 and 100 nanometers is disposed on at least a portion of the surface of the plunger main body;

(b) lowering the tubular string into a wellbore drilled into a subterranean zone;

(c) sufficiently increasing a fluid pressure of the fluids in the tubular string uphole of the float valve assembly to overcome a biasing force of the spring, thereby causing the plunger to move to an open position in which the seal ring is not in contact with the circumferential inner sealing surface; and (d) flowing a fluid in a downhole direction through the valve flow passage.

21. The method of claim 20, wherein the spring is a coil spring and the coil spring is partially or fully disposed within a helical passageway of a flexible spring sheath.

22. The method of claim 21, wherein the helical passageway is a sealed volume, and wherein the sealed volume is at least partially filled with an inert hydrostatic buffer material.

23. The method of claim 20, wherein the tubular string is a drill string, and wherein the fluid is a drilling fluid.

* * * * *